Patented June 12, 1934

1,962,371

UNITED STATES PATENT OFFICE 1,962,371

COLLOIDAL MANGANESE SOLUTIONS

John Torigian, Long Island City, N. Y., assignor to The Drug Products Co., Inc., Long Island City, N. Y., a corporation of New York No Drawing. Application August 6, 1931, Serial No. 555,647

5 Claims. (Cl. 167—68)

The present invention relates to improvements in the process of manufacturing and in the end product of a colloidal manganese solution adapted for use in the treatment of infections, and especially cocci infections; the administration of the same being intramuscularly and preferably in the gluteal region. More specifically, the invention is concerned with the production of a solution containing colloidal manganese as a main ingredient, the other accompanying ingredients, to be hereinafter more specifically described, serving purposes hereinafter to be described.

The disclosure of the process of manufacturing the subject matter of the invention will incidentally disclose the nature and properties of the product.

It has been found that among the organic acids, gluconic acid has been the best suitable to make a colloidal manganese solution, and for purposes of setting forth a typical compound embodying my invention, the said acid will be used in this disclosure. The proportions of ingredients employed are toward the formation of 1000 c. c. of colloidal manganese gluconate, it being understood that if another organic acid is employed the relative proportions of ingredients would vary accordingly.

In practicing the invention, 11 grams of manganese chloride, containing 3 grams of metallic manganese, is dissolved in 200 c. c. of double distilled water freshly prepared and deaerated. A solution of gluconic acid is then prepared by dissolving 28 grams of the said acid in 100 c. c. of double distilled water freshly prepared and deaerated. A solution of sodium hydroxide is next prepared by dissolving 4.4 grams of the said base in 100 c. c. of double distilled water freshly prepared and deaerated.

The sodium hydroxide solution is now added to the manganese chloride solution to which is further added the gluconic acid solution. The resultant of the chemical interactions taking place may be expressed in the following chemical equation:

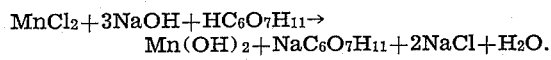

$$MnCl_2 + 3NaOH + HC_6O_7H_{11} \rightarrow Mn(OH)_2 + NaC_6O_7H_{11} + 2NaCl + H_2O.$$

Thereupon I add 20 c. c. of chemically pure benzylic alcohol and sufficient double distilled water freshly prepared and deaerated to make up 1000 c. c. of solution. The purpose of the addition of the said benzylic alcohol is to serve as a local anæsthetic for the area where the colloidal compound enters the body tissue.

The next step comprises the adjustment of the hydrogen ion concentration in solution. This is accomplished in the usual manner, and it has been found by experiment that for maximum stability the colloidal solution requires a pH hydrogen ion concentration of 6.6 to 6.8.

The colloidal solution as above prepared is sufficiently stable as not to require the addition of a protective colloid such as dextrose.

As the final steps in the preparation of colloidal manganese solution (following the adjustment of the hydrogen ion concentration) the compound is permitted to stand for not less than 48 hours to precipitate impurities in the event that the latter are present, whereupon the compound is filtered through washed filter paper into clean and dry glass containers. The filtrate is then passed into dry and sterile ampuls, which latter containing the colloidal manganese solution are sealed and sterilized at a temperature not over 100 degrees C.

The final colloidal manganese solution when examined under the ultramicroscope shows a fine dispersion of colloidal particles exhibiting a Brownian movement while a chemical test shows 0.00317 gram of metallic manganese to each cubic centimeter of solution.

The human dosage of the composition of my invention is one (1) c. c. on a basis of 160 pounds of body weight.

To show that there are no ill effects ancillary to the administration of colloidal manganese for treatment of cocci infections a biologic test was performed on a series of albino rats by injecting 150 times the human dosage of the said material. During a period of three days the animals did not show any reaction and after one week all of them were still alive.

The administration of colloidal manganese in the treatment of cocci infections has proved very successful and so far as your applicant is aware is the only product that does not require preservatives to maintain its properties. Colloidal manganese solution, the subject of my invention, lasts indefinitely and is an excellent remedy for supurative conditions.

I wish it understood that the proportions of ingredients hereinbefore mentioned are given merely by way of example and that the invention is not limited to such proportions as these may be varied so long as the required result is obtained. Likewise, in the manner of preparation, slight variations in the succession of steps may be resorted to without departing from the spirit of the invention nor enlarging the scope of the appended claims.

I claim:

1. A product for the treatment of cocci infections comprising the suspension of a colloidal manganese compound in the medium of an aqueous salt of gluconic acid.

2. A product for the treatment of cocci infections comprising the suspension of colloidal manganese hydroxide in the medium of aqueous sodium gluconate.

3. A colloidal therapeutic agent comprising the reaction product of a manganese salt, an alkaline hydroxide and gluconic acid.

4. A process for preparing a colloidal therapeutic agent comprising reacting a manganese salt with an alkaline base and adding to the reaction mass gluconic acid.

5. A process for preparing a colloidal therapeutic agent comprising reacting manganese chloride with sodium hydroxide and adding to the reaction mass gluconic acid.

JOHN TORIGIAN.